(12) United States Patent
Tanigawa et al.

(10) Patent No.: US 7,212,281 B2
(45) Date of Patent: May 1, 2007

(54) OPTICAL FIBER POLARIZATION MODE DISPERSION MEASUREMENT METHOD AND MEASUREMENT DEVICE

(75) Inventors: Shoji Tanigawa, Sakura (JP); Tomoharu Sagawa, Sakura (JP); Masataka Ikeda, Sakura (JP); Shoichiro Matsuo, Sakura (JP); Kuniharu Himeno, Sakura (JP); Koichi Harada, Sakura (JP)

(73) Assignee: Fujikura, Ltd., Tokyo (JP)

( * ) Notice: Subject to any disclaimer, the term of this patent is extended or adjusted under 35 U.S.C. 154(b) by 162 days.

(21) Appl. No.: 10/521,236

(22) PCT Filed: Jul. 18, 2003

(86) PCT No.: PCT/JP03/09175

§ 371 (c)(1),
(2), (4) Date: Jan. 14, 2005

(87) PCT Pub. No.: WO2004/010098

PCT Pub. Date: Jan. 29, 2004

(65) Prior Publication Data

US 2005/0259241 A1 Nov. 24, 2005

(30) Foreign Application Priority Data

Jul. 19, 2002 (JP) .............................. 2002-211387
Sep. 6, 2002 (JP) .............................. 2002-261283

(51) Int. Cl.
*G01N 21/00* (2006.01)
(52) U.S. Cl. .................................... 356/73.1
(58) Field of Classification Search ..................... None
See application file for complete search history.

(56) References Cited

U.S. PATENT DOCUMENTS

| 5,966,207 A | 10/1999 | Haskins et al. |
| 6,504,604 B1 * | 1/2003 | Holland ..................... 356/73.1 |
| 6,724,469 B2 * | 4/2004 | Leblanc ..................... 356/73.1 |

FOREIGN PATENT DOCUMENTS

| CN | 1265193 A | 8/2000 |
| EP | 1 258 719 A1 | 11/2002 |
| JP | S62-207927 A | 9/1987 |
| JP | 2000-329651 B1 | 11/2000 |

(Continued)

OTHER PUBLICATIONS

B. Huttner et al.., Distributed PMD Measurement with a Polarization-OTDR in Optical Fibers, Journal of Lightwave Technology, Oct. 1999, pp. 1843-1848, vol. 17, No. 10.

(Continued)

*Primary Examiner*—Tu T. Nguyen
(74) *Attorney, Agent, or Firm*—Sughrue Mion, PLLC

(57) ABSTRACT

A method of measuring polarization mode dispersion of an optical fiber includes inputting linearly polarized pulse light into an optical fiber, separating the input linearly polarized light from backscattered light from the optical fiber, detecting a light intensity of the backscattered light as time series data since the generation of the pulse light, calculating a fluctuation of the detected light intensity in the time series data, and evaluating polarization mode dispersion in the optical fiber, based on the calculated fluctuation value.

13 Claims, 10 Drawing Sheets

FOREIGN PATENT DOCUMENTS

| | | |
|---|---|---|
| JP | 2001-51150 B1 | 2/2001 |
| JP | 2001-228054 A | 8/2001 |
| JP | 2001-516021 A | 9/2001 |
| JP | 2002-048680 * | 2/2002 |
| JP | 2002-48680 A | 2/2002 |
| WO | WO 99/09397 A1 | 2/1999 |
| WO | WO 01/61303 A1 | 8/2001 |

OTHER PUBLICATIONS

Tomioka et al., Proceedings of the 2002 IEICE General Conference B-10-113, Mar. 27-30, 2002, The Institute of Electronics, Information and Communication Engineers, Waseda University, Tokyo.

* cited by examiner

OPTICAL FIBER POLARIZATION MODE DISPERSION MEASUREMENT METHOD AND MEASUREMENT DEVICE

TECHNICAL FIELD

The present invention relates to a method of measuring polarization mode dispersion of an optical fiber having a comparatively small birefringence that is used in a fiber-optic communication system, and to a measuring apparatus for the same.

BACKGROUND ART

Polarization mode dispersion (PMD) is an important consideration when dealing with an optical fiber used in a fiber-optic communication system and it can be generated by concentricity error or the non-circularity of the core of an optical fiber, or by external stress or the like. Polarization mode dispersion is a group delay difference between two orthogonal polarization modes of propagated light along an optical fiber. The larger the polarization mode dispersion of an optical fiber, the more the pulse width is spread by this group delay difference. Therefore, polarization mode dispersion is one factor preventing high-speed transmission. As a result, when planning and constructing a fiber-optic communication system, the planner or constructor should comprehend or measure values of the PMD of the optical fibers used in the system. An interferometric method and a Jones Matrix Eigenanalysis method and the like are well-known measuring methods for the PMD of an optical fiber.

However, using the above-mentioned conventional PMD measuring methods, it is only possible to measure cumulative PMD over the whole length of the measured optical fiber. Consequently, using these methods, it is impossible to detect where individual sections of an optical fiber may have sizable PMD. Therefore, for example, if one wants to increase the transmission speed of a transmission line (i.e. an optical fiber) including that of a section or sections having sizable PMD, either the entire line or individual sections of the line should be replaced. However, using the above-described methods, in order to replace only those sections having high PMD, it is necessary to break the line into short sections and measure the PMD of each section separately. Neither of these methods have proved to be a good solution for reducing PMD and increasing speed in the line.

Moreover, in the case of manufacturing an optical cable from multiple optical fibers, it is not possible to sort out those sections having sizable PMD in advance. As a result, in order to reduce PMD, it has been necessary to measure the polarization mode dispersion of all the fibers in each cable (which may include sections with sizable PMD) after the formation of the cable in order to make an inspection thereof. The inspection and measurement of the PMD of such a cable unnecessarily increases the cost of manufacturing the cable.

Furthermore, when measuring PMD by one of the above mentioned methods, it is necessary to create a light incident section at one end of the optical fiber and to create a light detect section at the other end thereof. Therefore, when measuring the PMD of a predetermined section of an existing line or the like, there is often a long distance between the light incident section and the light detect section, and synchronization of the measuring system becomes difficult.

To solve these problems, methods of measuring the longitudinal distribution of PMD using Rayleigh scattered light have been proposed in, for example, "Journal of Lightwave Technology", B. Hattner et. al., Volume 17, No. 10, pp. 1843–1848, "Proceedings of the 2002 IEICE General Conference", 2002, Tomioka et. al., B-10-113, and Japanese Unexamined Patent Application, First Publication No. 2000-329651.

However, because these methods require high-cost devices such as a tunable light source, a polarization controller, a polarization analyzer, a phase detector or the like, the costs of the apparatuses are unreasonably high for actual use. Moreover, in order to perform measurements for a plurality of polarization states long measurement times or a plurality of detectors are required, either of which also results in unnecessarily high costs.

DISCLOSURE OF THE INVENTION

The present invention was conceived in view of the above circumstances and it is an object thereof to provide an optical fiber polarization mode dispersion measuring method and measuring apparatus that enable the longitudinal distribution of a polarization mode dispersion of an optical fiber to be obtained easily using a simple apparatus.

According to a first exemplary aspect of the present invention, a method of measuring polarization mode dispersion in an optical fiber includes inputting linearly polarized pulse light into the optical fiber, separating the input linearly polarized light from backscattered light from the optical fiber, detecting a light intensity of the backscattered light as time series data since the generation of the pulse light, calculating a fluctuation of the detected light intensity, and evaluating polarization mode dispersion in the optical fiber, based on the calculated fluctuation value.

The plane of polarization of the input linearly polarized light may be the same as the plane of polarization of the backscattered light from the optical fiber.

A first fluctuation of light intensity can be calculated by inputting linearly polarized pulse light into a first end of the optical fiber and detecting time series data of the light intensity of the backscattered light through the first end of the fiber. A second fluctuation of light intensity can be calculated by inputting linearly polarized pulse light into a second end of the optical fiber and detecting time series data of the light intensity of the backscattered light through the second end of the fiber. Thereby, the polarization mode dispersion in the optical fiber can be evaluated based on an average value of the first fluctuation of light intensity and the second fluctuation of light intensity.

The polarization mode dispersion of a predetermined section of the optical fiber can be evaluated by comparing the fluctuation of the light intensity measured in the predetermined section of the optical fiber with the fluctuation of the light intensity measured using the same method in an optical fiber whose polarization mode dispersion is already known.

A longitudinal distribution of polarization mode dispersion in an optical fiber can be evaluated by comparing the fluctuation of the optical intensity measured in each of a plurality of sections in the longitudinal direction of the optical fiber with fluctuation of the light intensity measured using the same method in an optical fiber whose polarization mode dispersion is already known.

The fluctuation of the light intensity can be calculated as fluctuation in a regression residual error using the least-square method. Furthermore, the scale of the fluctuation of the light intensity can be standard deviation or a difference between a maximum intensity and a minimum intensity in predetermined section.

An apparatus for carrying out the above described method, according to a second exemplary aspect of the present invention includes a pulse generating device, an optical circulator that inputs pulse light generated by the pulse light generating device into an end of the optical fiber, and outputs backscattered light that has returned through the end of the optical fiber, a photodetector that detects a light intensity of the backscattered light output from the optical circulator as time series since the generation of the pulse light, an analyzer that analyzes polarization mode dispersion in an optical fiber based on the light intensity of the backscattered light output from the photo detector, and at least one polarizer that linearly polarizes incident light input into the optical fiber and backscattered light output from the optical fiber.

The at least one polarizer can polarize the incident light input into the optical fiber and the output light output form the optical fiber into linearly into linearly polarized light of the same plane of polarization. The polarizer can be a polarization-beam-combiner-type coupler.

The apparatus for measuring polarization mode dispersion in an optical fiber can include a OTDR apparatus, and a polarizer that polarizes both incident light input into the optical fiber and output light from the optical fiber into linear polarized light of the same plane of polarization. Further, an optical amplifier apparatus can be provided between the commercialized OTDR apparatus and the polarizer.

BRIEF DESCRIPTION OF THE DRAWINGS

These and other features, aspects, and advantages of the present invention will become better understood with reference to the following description and accompanying drawings, which should not be read to limit the invention in any way, in which.

BEST MODE FOR CARRYING OUT THE INVENTION

The present invention will now be described in detail based on the exemplary embodiments.

Figure 1:
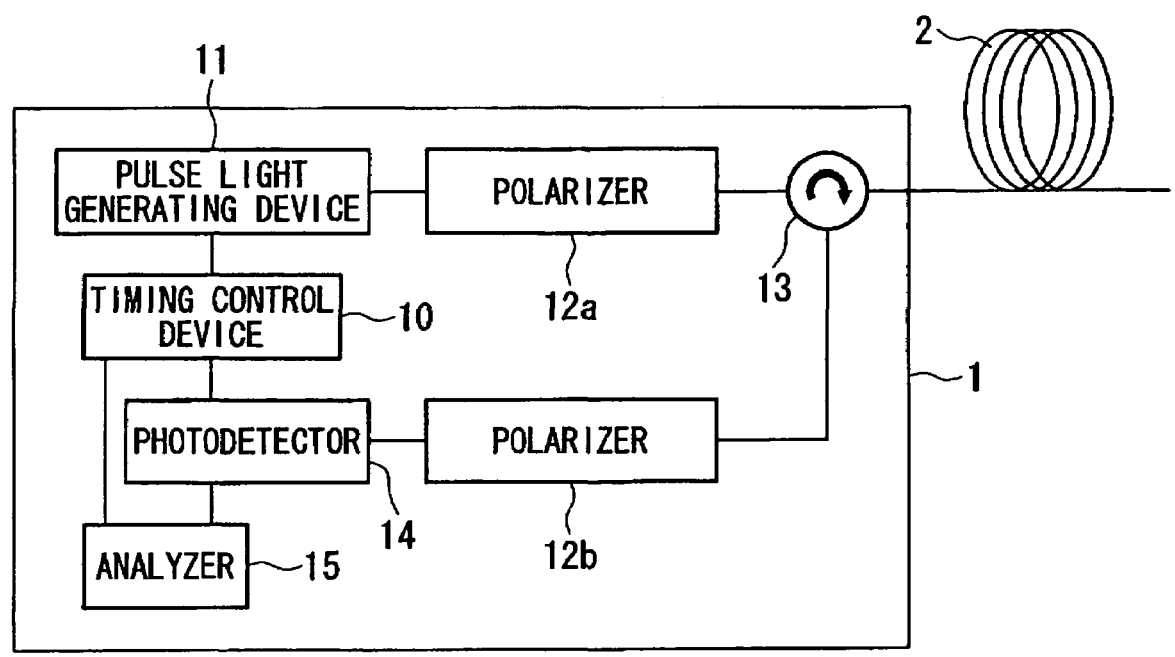
FIG. 1 is a schematic view of a first example of a polarization mode dispersion measuring apparatus.

FIG. 1 shows a measuring apparatus used in a method of measuring the polarization mode dispersion of an optical fiber 2, according to a first exemplary embodiment of the present invention.

The measuring apparatus 1 is provided with a timing control device 10, a pulse light generating device 11, first and second polarizers 12a and 12b, an optical circulator 13, a photodetector 14, and an analyzer 15.

The timing control device 10 outputs timing signals that correspond to the output timing of pulse light to each of the pulse light generating device 11, the photodetector 14, and the analyzer 15. Timing signals are pulse signals having a predetermined duration.

The pulse light generating device 11 emits continuous light of a wavelength of several kHz, and emits light pulses of a predetermined wavelength using as a trigger timing signals input from the timing control device 10. By controlling the duration of the timing signals, the width of the light pulses can be appropriately controlled. A semiconductor laser fitted with an external resonator, a semiconductor laser excitation solid-state laser, or the like, for example, may be used as the pulse light generating device 11.

The first and second polarizers 12a and 12b linearly polarize incident pulse light and backscattered light, respectively. The polarizers 12a and 12b may be set such that the optional plane of polarization of the linear polarized light input into the optical fiber 2 and the linear polarized light output from the optical fiber 2 are not the same. However, it is desirable, though not necessary, that the polarizers 12a and 12b are adjusted such that the plane of polarization of the linear polarized light input into the optical fiber 2 and that of the linear polarized light output from the optical fiber 2 are the same. Rarely, the light intensity of linearly polarized light separated by the polarizer is so small that it cannot be measured. In such cases, by adjusting the polarization splitting devices 12a and 12b beforehand such that they set an identical plane of polarization for both the linear polarized light input into the optical fiber and the linear polarized light output from the optical fiber in same plane of polarization, it is possible to adjust the polarizers 12a and 12b when adjusting the axial direction of the optical fiber and the angle of the plane of polarization such that measurement becomes possible. Bulk-type polarizers and the like can be used as the polarizers 12a and 12b. However, polarization-beam-combiner-type couplers are preferable, though not necessary, from the standpoints of dynamic range and long-term reliability because they have low insertion loss and high reliability. As a polarization-beam-combiner-type coupler that can be used for the polarizers 12a and 12b, the polarization-beam-combiner-type coupler described in Japanese Unexamined Patent Application, First Publication No. 2001-51150, for example, can be used.

The optical circulator 13 is an optical component that inputs light that has been incident from the pulse light generating device 11 into the optical fiber 2, and that also outputs backscattered light from the optical fiber 2 being measured into the photodetector 14. A circulator, beam splitter, directional coupler, or the like can be used as the optical circulator 13.

The photodetector 14 ascertains the times when pulse light is generated based on control signals sent from the timing control device 10, and measures, in time domains, the light intensity of backscattered light that has been polarized by the second polarizer 12b as a time series from the times of pulse light generation. A photodetector such as an A/D converter can be used for the photodetector 14.

The analyzer 15 is a device that analyzes the longitudinal distribution of polarization mode dispersion of the optical fiber 2, using the method described below, based on fluctuation of the light intensity in the time series data detected by the photodetector 14. A computer that is able to perform statistical analysis on the time series data expressed by a relationship between the distance and light intensity in the optical fiber can be used for the analyzer 15.

Next, a first exemplary embodiment of a method of measuring polarization mode dispersion of an optical fiber using the measuring apparatus 1 described above will be described.

First, using the pulse light generating device 11 and the first polarizer 12a, linearly polarized pulse light is generated. This light is then input into the optical fiber 2 via the optical circulator 13. The incident pulse light that has been input into the optical fiber 2 is partly scattered backwards by Rayleigh scattering as the incident light is propagated along the optical fiber 2, and backscattered light is returned to the measuring apparatus 1. Using the second polarizer 12b linearly polarized light having a predetermined plane of polarization is separated from the backscattered light. Next, the light intensity is detected as time series data starting from the generation of pulse light by the photodetector 14.

Figure 2:
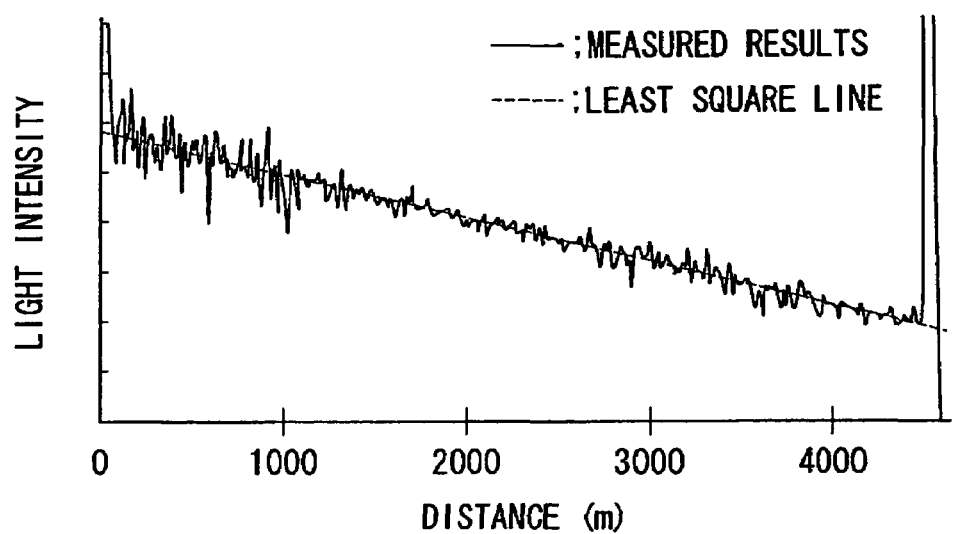
FIG. 2 is a graph showing an example of a relationship between a distance in the longitudinal direction of an optical fiber and a light intensity of backscattered light.

As is shown in FIG. 2, for example, time series data of the light intensity that is obtained in this way is measured on the horizontal axis taken as time elapsed since the generation of pulse light and the vertical axis taken as the light intensity. The time elapsed since the generation of pulse light is the time required for light to travel reciprocally between the measuring apparatus 1 and the location in the optical fiber 2 where backscattered light is generated, and corresponds to the distance between the measuring apparatus 1 and the location where the backscattered light is generated. In time series data such as this, fluctuation is observed in the light intensity of the backscattered light.

As a result of intense research carried out by the inventors of the present invention, it was determined that when the incident pulse light is a linear polarized light and the light intensity of the backscattered light is detected as a linearly polarized light having a predetermined plane of polarization, then a monotone relationship exists between the polarization mode dispersion of the optical fiber and the fluctuation of the light intensity of the backscattered light. It was also determined that there is a tendency for the fluctuation of the light intensity to be less as the polarization mode dispersion is greater, and for the fluctuation of the light intensity to be greater as the polarization mode dispersion is less.

The state of polarization of pulse light that is propagated along the optical fiber 2 changes with the polarization mode dispersion. The greater the polarization mode dispersion, the shorter the distance over which the state of polarization changes. This change of the state of polarization causes the fluctuation of the linear polarized component of the backscattered light.

On the other hand, the spatial resolution of the measuring apparatus 1 is determined from the length of the pulse light generated by the pulse light generating device 11 in the optical fiber 2 and from the time resolution of the photodetector 14.

If there is considerably large polarization mode dispersion, because the state of polarization of pulse light that is propagated along the optical fiber 2 changes in a sufficiently shorter distance than the spatial resolution of the measuring apparatus 1, the fluctuation of the linear polarized component of the backscattered light are leveled out and observed fluctuation of the light intensity is reduced.

In contrast, if there is a small polarization mode dispersion, because the changes in the state of polarization of the pulse light take place in approximately the same distance as the spatial resolution of the measuring apparatus 1 or in a longer distance than the spatial resolution of the measuring apparatus 1, there is little or no leveling out of the fluctuation of the linear polarized component of the backscattered light and the observed fluctuation of the light intensity remains large.

Accordingly, it is possible to evaluate polarization mode dispersion of an optical fiber based on the observed fluctuation of the light intensity.

Next, a description will be given of a first example of a method of evaluating polarization mode dispersion in a predetermined section of an optical fiber from fluctuation of the light intensity in obtained time series data.

Figure 3:
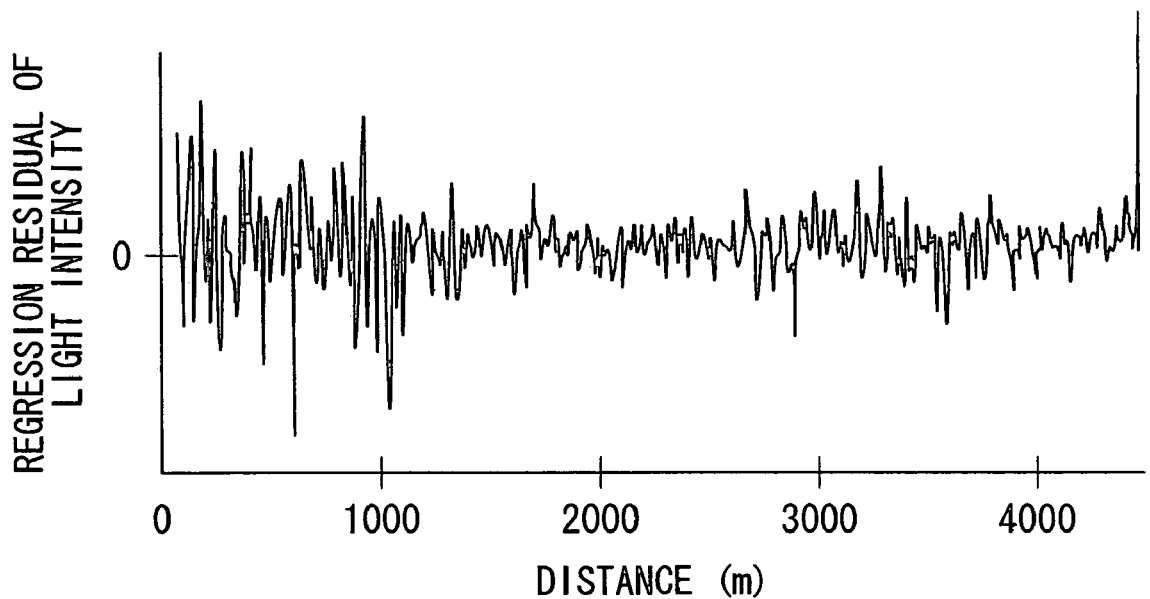
FIG. 3 is a graph showing an example of a relationship between a distance in the longitudinal direction of an optical fiber and a regression residual error of the light intensity of backscattered light.

In order to quantify the fluctuation of the light intensity, first, it is necessary to calculate a representative center value that forms the center of the fluctuation. As this representative center value, it is possible, for example, to use an average value of the light intensity within the relevant section. However, generally, the light intensity of backscattered light is attenuated linearly as the distance increases by attenuation of the input pulse light. Therefore, it is preferable, though not necessary, that linear regression be performed for the relationship between distance and light intensity over the entire length of the optical fiber 2 using the least-square method, and that, taking the estimated amount of this regression as the representative center value of the section, the fluctuation of the light intensity is calculated based on the regression residual error obtained by subtracting the estimated amount of the least squares from the measured value of the light intensity in the section. As a result, it is possible to remove the effect of attenuation on the light intensity that is proportional to distance. As an example, the results when the distribution of the regression residual error is calculated from the fluctuation of the light intensity in FIG. 2 are shown in FIG. 3. By converting the light intensity into regression residual error in this way, the fluctuation of the light intensity can be expressed around 0 thereof.

Fluctuation in the regression residual error of the light intensity can be indexed and quantified in the form of a suitable scale that is in general use statistically. Examples of such a scale include standard deviation, the difference between maximum value and minimum value (i.e., the range), averaged deviation, and averaged difference. Among these, standard deviation or the range are preferable, though not necessary, because standard deviation is unbiased and calculation of the range is easy.

The length of the section used to determine distribution of the polarization mode dispersion is preferably determined so as to correspond to the envisioned beat length of the optical fiber 2. The beat length is the length over which the phase difference between mutually-perpendicular X polarized light and Y polarized light becomes $2\pi$ as the light is propagated along the optical fiber. In a conventional single mode optical fiber, because the beat length is several meters to several tens of meters, it is preferable that the length of a section sets two to ten times the beat length, and approximately 100 meters would be suitable. As a result, error in the measured values caused by phase differences between the two mutually-perpendicular polarized lights are sufficiently small, and it is possible to obtain meaningful values from a measurement.

Figure 4:
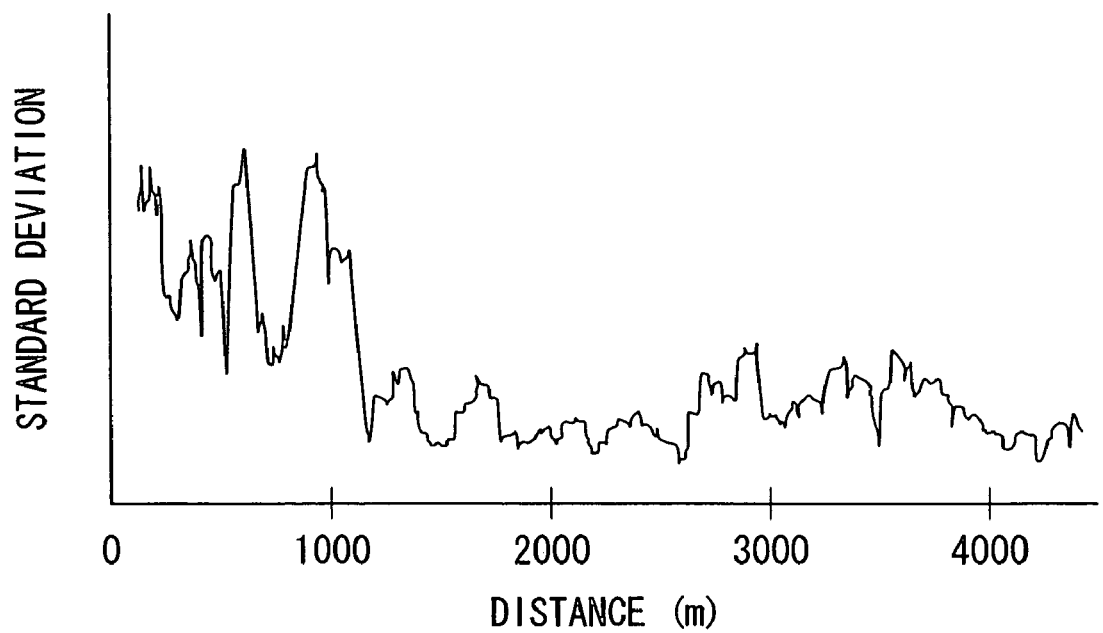
FIG. 4 is a graph showing an example of a relationship between a distance in the longitudinal direction of an optical fiber and a standard deviation for each predetermined interval of the regression residual error of the light intensity of backscattered light.

As an example, the results of calculating fluctuation of the light intensity at intervals of 100 meters from the distribution of the regression residual error of the light intensity shown in FIG. 3 are shown in FIG. 4. As can be understood from this drawing, by taking a section length that is sufficiently longer than the beat length, unessential conspicuous oscillations and variations are flattened, and it is possible to obtain a distribution that conforms to the distribution of the polarization mode dispersion.

Using a process such as that described above, by obtaining the quantified fluctuation in the regression residual error of the light intensity is in each section, the fluctuation shows a high correlation with the polarization mode dispersion in any section. Therefore, by taking as a reference an optical fiber whose polarization mode dispersion has been measured using a known method such as Jones Matrix Eigenanalysis method or the like, it is possible to determine the relationship between the polarization mode dispersion and the quantified fluctuation by obtaining the quantified fluctuation in the regression residual error of the light intensity for this reference optical fiber and comparing it to the result (i.e. quantified fluctuation) for the optical fiber $2t$. As the reference of optical fiber, an optical fiber whose material and optical characteristics are similar type to those of the optical fiber 2 should be used. Furthermore, the reference optical fiber should be one in which the fluctuation in the regression residual error of the light intensity is substantially uniform over the entire length thereof.

Next, another example of a measuring apparatus used in a method of measuring polarization mode dispersion of the present invention will be described.

Figure 5:
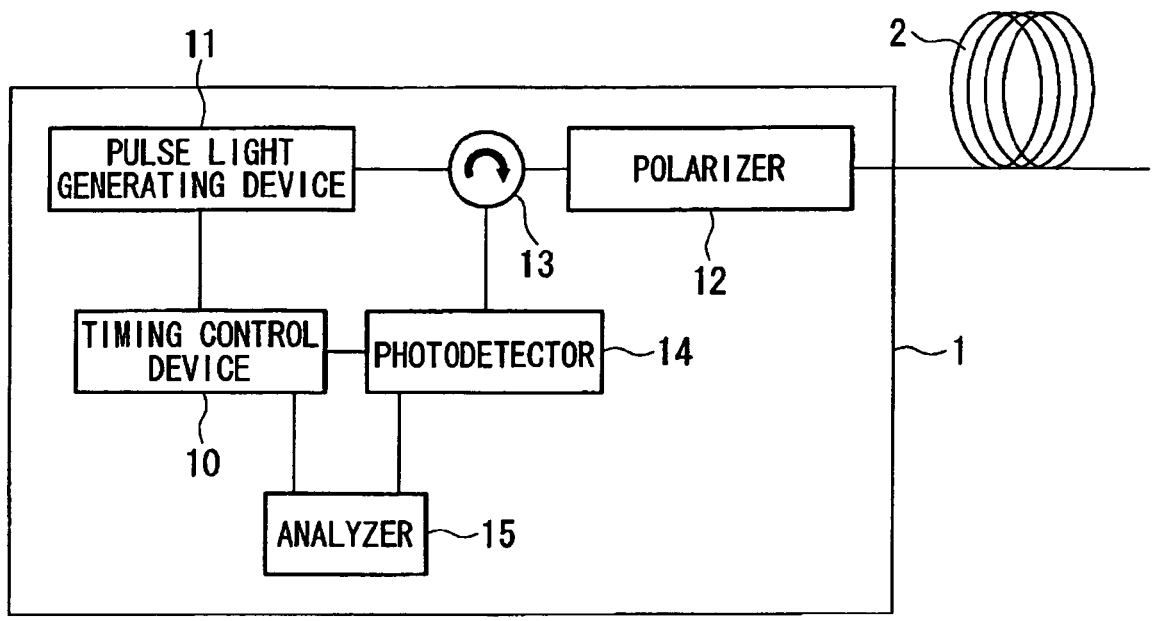
FIG. 5 is a schematic view of a second example of a polarization mode dispersion measuring apparatus.

In the second example of a measuring apparatus as shown in FIG. 5, the polarization splitting device 12 is placed between the optical circulator 13 and the optical fiber 2. As a result, the polarization splitting device 12 can be used to modify either incident pulse light or backscattered light. The remainder of the structure of the apparatus can be the same as the structure of the first example of the measuring apparatus 1 shown in FIG. 1. According to this measuring apparatus 1 of FIG. 5, because it is possible to reduce the number of polarization splitting devices 12 that are required to one, the cost of the measuring apparatus 1 can be lowered even further. Moreover, in the measuring apparatus 1 shown in FIG. 1, when the polarization plane of the incident pulse light is adjusted with the polarization plane of backscattered light, which is shown as a possible embodiment, it is necessary to adjust the directions of the both first polarizer 12a and the second polarizer 12b so that the polarization plane of the incident pulse light matches the polarization plane of the backscattered light. However, according to the measuring apparatus 1 of the present embodiment of FIG. 5, this type of adjustment is not required.

Figure 6:
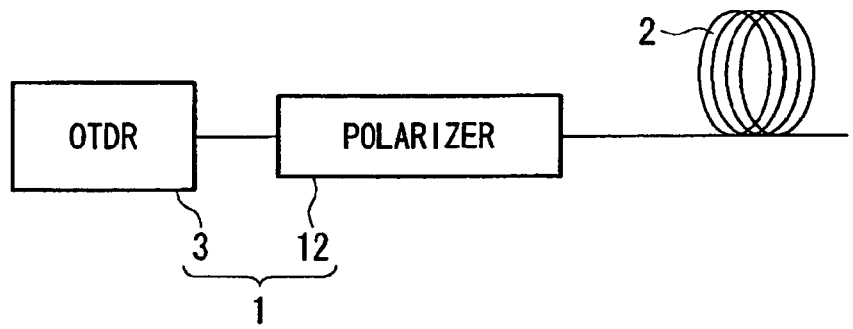
FIG. 6 is a schematic view of a third example of a polarization mode dispersion measuring apparatus.

A third example of a measuring apparatus 1 as shown in FIG. 6 is an apparatus that is provided with a commercialized optical time domain reflectometer (OTDR) apparatus 3 and a polarizer 12. The polarizer 12 is placed between the OTDR 3 and the optical fiber 2. By including in the OTDR 3 a timing control device 10, a pulse generating device 11, a optical circulator 13, a photodetector 14, and an analyzer 15, it is possible to implement the same type of measurement as that performed by the measuring apparatus 1 shown in FIG. 1. As a result, because it is possible to combine the commercialized OTDR apparatus 3 and the polarizer 12 when measuring polarization mode dispersion, and to remove the polarizer 12 when it is not required, and use the OTDR apparatus 3 as a normal OTDR apparatus 3, measurement of polarization mode dispersion can be performed even more easily and less costly.

Figure 7:
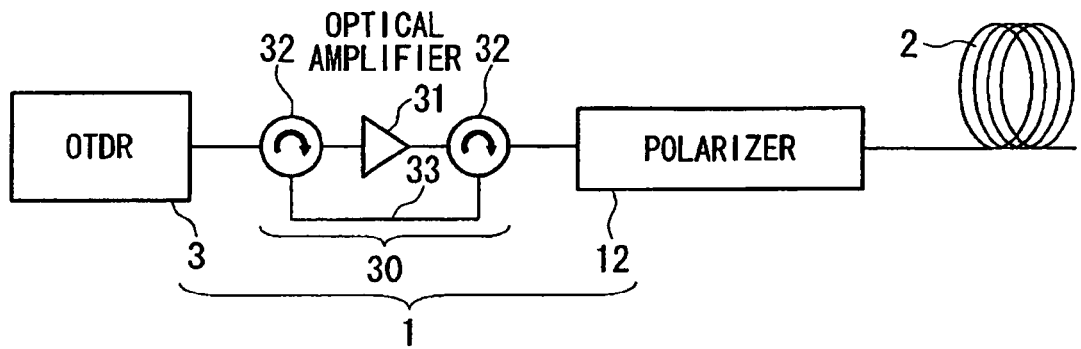
FIG. 7 is a schematic view of a fourth example of a polarization mode dispersion measuring apparatus.

In the fourth example of the measuring apparatus 1 shown in FIG. 7, an optical amplifier 30 that amplifies incident pulse light is placed between the OTDR 3 and the polarizer 12 of the measuring apparatus 1 shown in FIG. 3. The optical amplifier 30 is formed by an optical amplifier 31, two circulators 32, and a detour transmission path 33. The circulation direction of the circulators 32 is such that incident pulse light is propagated on the optical amplifier 31 side and backscattered light is propagated on the detour transmission path 33 side. As a result, because only the incident pulse light has been amplified, and because the linear polarized component of the backscattered light is incident without amplification into the OTDR 3 after it has been separated from the backscattered light by the polarizer 12, measurement over an even longer distance is possible. Moreover, because the respective components are not special components and commercialized components can be used for any or all of them, costs can be reduced.

Next, a second exemplary embodiment of a method of measuring polarization mode dispersion of the present invention will be described.

In this measurement method, the two ends of the optical fiber 2 can be differentiated by being named respectively, for example, end a and end b. First, the measuring apparatus 1 is connected to end a of the optical fiber 2 and, using the same procedure as in the first example of the measurement method described above, a first fluctuation of the light intensity is calculated by inputting linear polarized pulse light into the end a and then detecting time series data of the linear polarized light intensity.

Next, the measuring apparatus 1 is connected to the end b of the optical fiber 2 and, in the same way, a second fluctuation of the light intensity is calculated by inputting linear polarized pulse light into the end b and then detecting time series data of the linear polarized light intensity.

The first fluctuation of the light intensity that was measured from the end a and the second fluctuation of the light intensity that was measured from the end b are then averaged with the positions in the longitudinal direction of the optical fiber 2 matched. Then, based on this average value, the polarization mode dispersion of the optical fiber 2 is evaluated using the same procedure as that used in the above-described first embodiment of the measurement method.

Figure 8:
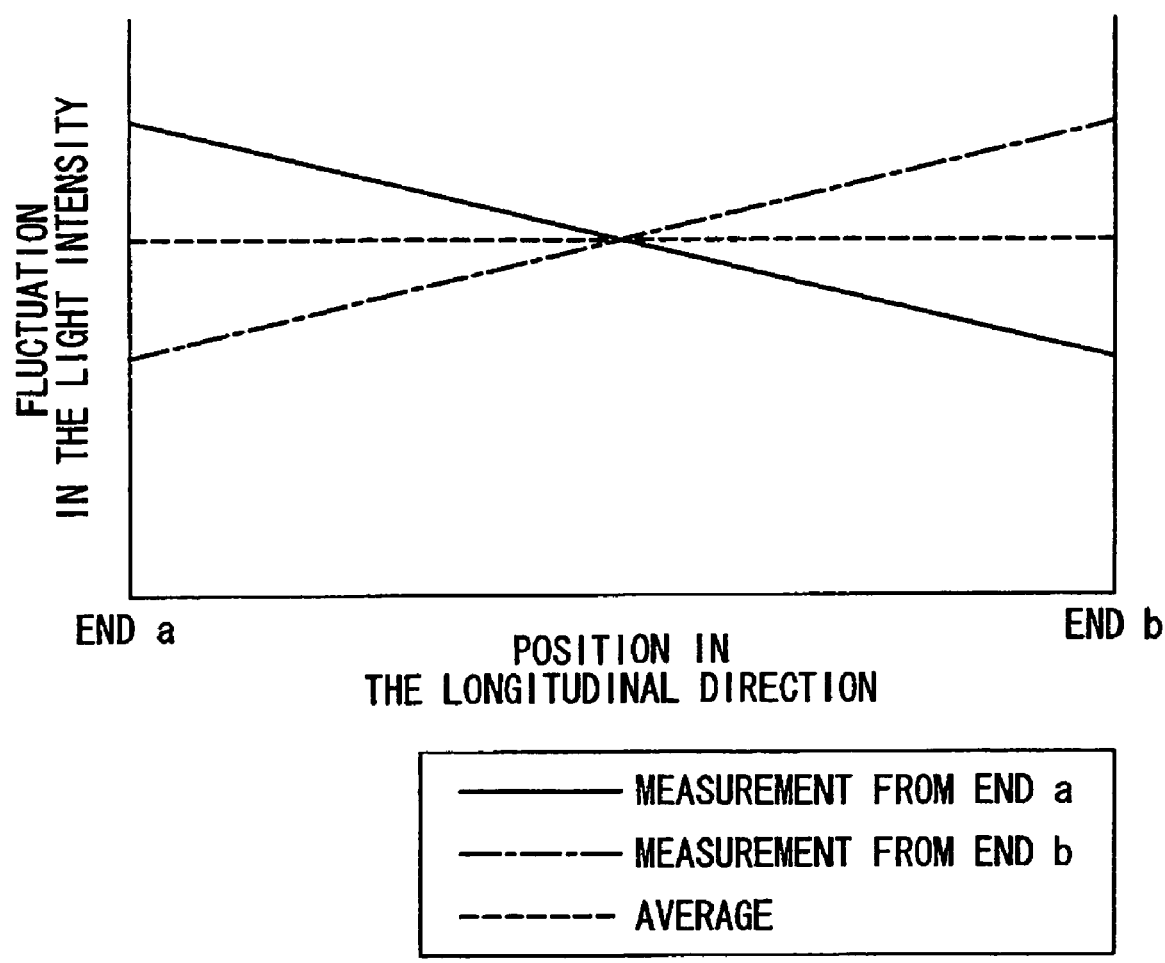
FIG. 8 is a graph comparing unevenness in light intensity measured from opposite ends of a long optical fiber.

An example of a case in which it is useful to make a measurement respectively from each end of the optical fiber 2 in this way is one in which the optical fiber 2 is comparatively long. In such a case, as pulse light that is input from an incident end of the optical fiber 2 propagates across the long distance of the optical fiber 2, the detected backscattered light becomes depolarized. Therefore, coherency in this pulse light is reduced and, as is shown in typical view in FIG. 8, fluctuation of the light intensity that returns to the measuring apparatus 1 is sometimes less than a size that reflects the actual polarization mode dispersion of the optical fiber 2. In other words, for example, when the polarization mode dispersion of the optical fiber 2 is substantially uniform over the entire length in the longitudinal direction thereof, the accumulated polarization mode dispersion from the incident end is determined by the distance from the incident end. As a result, as is shown in FIG. 8, the further the distance from the incident end, the greater the effects of the accumulated polarization mode dispersion and the smaller the fluctuation of the light intensity. Therefore, superficially, at a position that is at a distance from the incident end, the apparent polarization mode dispersion is observed as being worse than the actual polarization mode dispersion if the optical fiber is measured by the method of the first embodiment of the method of measuring polarization mode dispersion of the present invention.

This type of apparent increase of polarization mode dispersion is more conspicuous the greater the distance between the point being observed and the measuring apparatus 1. For example, if the length of the optical fiber 2 is 15 km or more, this effect cannot be ignored.

Therefore, by averaging the fluctuation of the light intensity between the obtained value from the end a and the obtained value from the end b, it is possible, as is shown by the dashed line in FIG. 8, to reduce the effects of the apparent deterioration in the polarization mode dispersion that is caused by a reduction in the coherency of the pulse light, and to obtain an accurate value.

Accumulated PMD between the point being observed and the measuring apparatus 1 affect the reduction in the coherency of the pulse light. For example, if there is a section along the optical fiber 2 in which the polarization mode dispersion is remarkably bad, then for polarization mode dispersion at a position beyond that section (i.e. the position farther from the PMD bad section from incident end), backscattered light from that position has to pass through the section where the polarization mode dispersion is remarkably bad. That is, if there is a section between the point and the measuring apparatus 1 where the polarization mode dispersion is particularly bad, when observed it appears to be worse than the real value.

This problem will now be described with reference made to the graph of FIG. 9. For example, it will be taken that there are two sections, pq and st, in a portion of the optical fiber 2 where the polarization mode dispersion is particularly bad (the sequence point "p", point "q", point "s", and point "t" is the sequence going from the end "a" to the end "b").

In a waveform APQSTB of fluctuation of the light intensity measured by inputting pulse light from the end a, a difference in level $\Delta 1$ is generated between the line AP and the line QS by the effects of the section pq, and a difference in level $\Delta 2$ is generated between the line QS and the line TB by the effects of the section st. As a result, fluctuation of the light intensity is lowered by the amount $\Delta 1$ in the section qs, and in the section tb is further lowered by the amount $\Delta 1+\Delta 2$. Therefore, in a measurement from the one end side only, the polarization mode dispersion in the section on the further side from the measuring apparatus appears upon observation to be worse than the actual polarization mode dispersion.

Therefore, in the same way, if the measuring apparatus 1 is connected to the end b side, and fluctuation of the light intensity is measured by inputting pulse light from the end b, in a waveform A'P'Q'S'T'B' of fluctuation of the light intensity, a difference in level $\Delta 2$ is generated between the line T'B' and the line Q'S' by the effects of the section st, and a difference in level $\Delta 1$ is generated between the line Q'S' and the line A'P' by the effects of the section pq. As a result, fluctuation of the light intensity is lowered by the amount $\Delta 2$ in the section qs, and in the section ap is further lowered by the amount $\Delta 1+\Delta 2$.

Accordingly, if an average is taken of the measured value from the end a and the measured value from the end b, the effects of the difference in level $\Delta 1$ and difference in level $\Delta 2$ are generated equally between the section ap, the section qs, and the section tb, and it is possible to nullify the effects thereof. As a result, it is possible to reliably detect sections on the optical fiber 2 where the polarization mode dispersion is bad.

Next, the present invention will be described in more detail based on the exemplary embodiments.

Figure 10A:
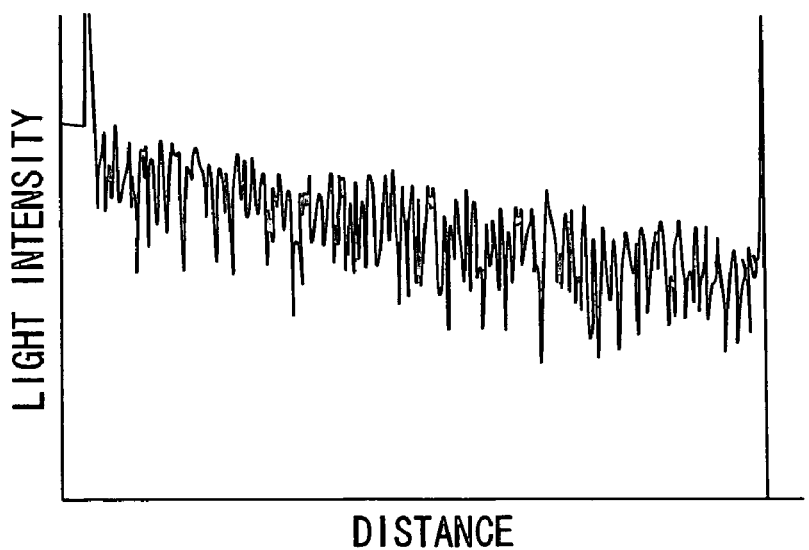
FIGS. 10A to 10C are graphs illustrating examples of the light intensity of backscattered light of a conventional optical fiber whose polarization mode dispersion is known.
Figure 10B:
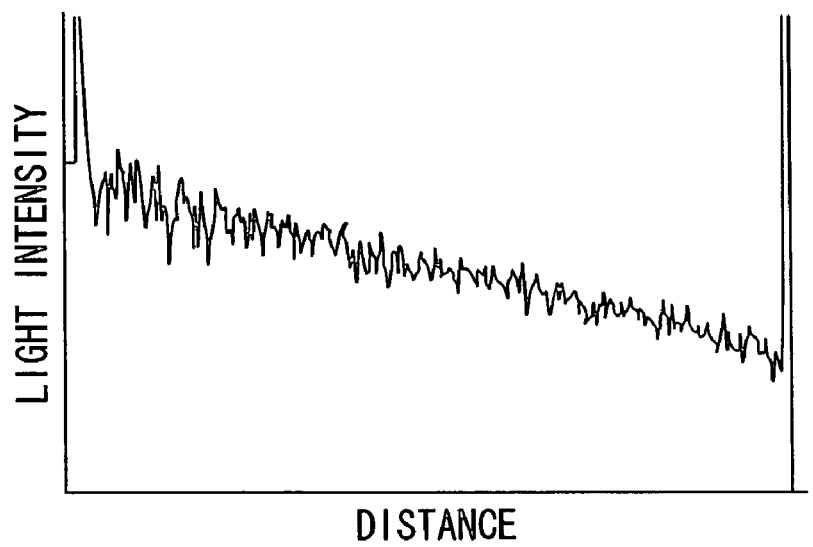
Figure 10C:
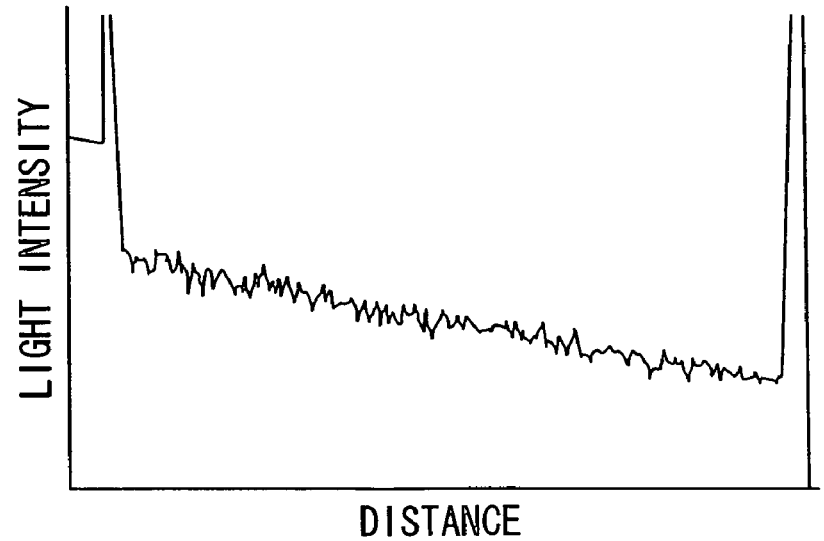

The results obtained by inputting pulse light having a linear polarization into conventional single mode optical fibers of 0.04 ps/√km, 0.09 ps/√km, and 0.12 ps/√km using the Jones Matrix Eigenanalysis method in which the polarization mode dispersion is substantially uniform across the entire length in the longitudinal direction thereof, and then measuring input pulse light of the backscattered light formed thereby and the intensity of its linear polarized component are shown in FIGS. 10A to 10C, respectively. As is shown by these results, the greater the polarization mode dispersion the smaller the width of fluctuation of the light intensity.

Figure 11:
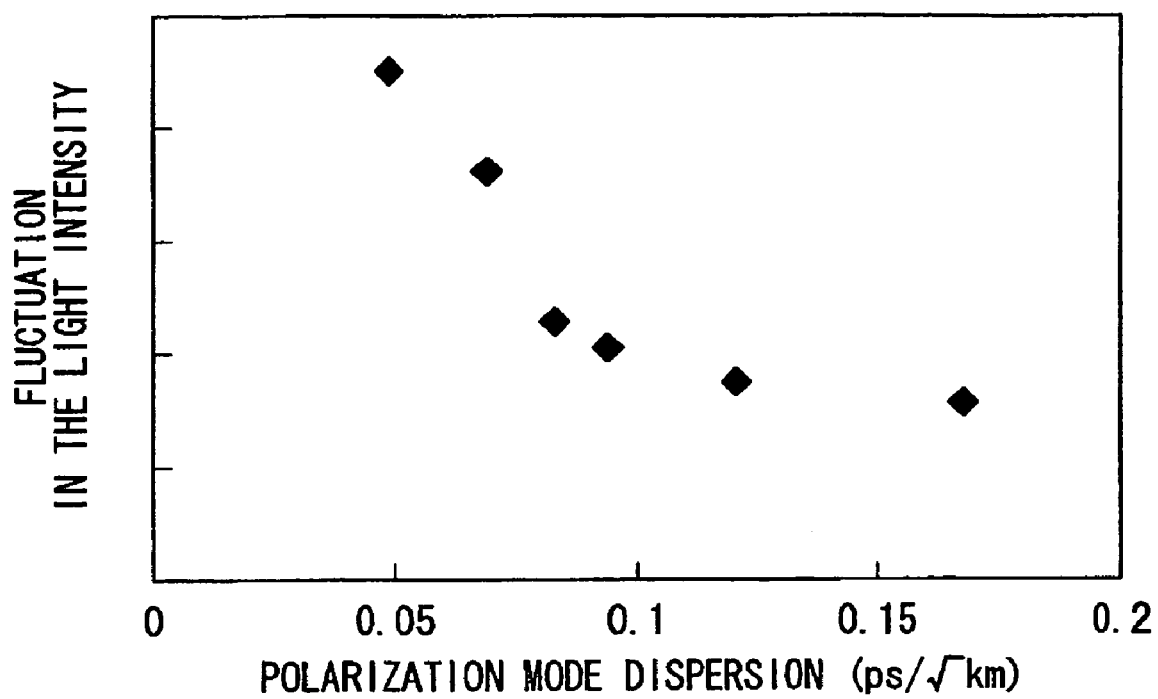
FIG. 11 is a graph illustrating an example of a relationship between fluctuation of the light intensity of a conventional optical fiber and polarization mode dispersion.

A relationship between the results of a measurement of polarization mode dispersion that are determined using Jones Matrix Eigenanalysis method and fluctuation of the light intensity measured using the measuring method of the present invention are shown in FIG. 11. The horizontal axis measures the polarization mode dispersion measured using Jones Matrix Eigenanalysis method, while the vertical axis measures the standard deviation of the regression residual error of the light intensity measured using the measuring method of the present invention. In both the measuring method of the present invention and in the Jones Matrix Eigenanalysis method, for the respective optical fibers the measurements were repeated five times with intervals between each test so that average values thereof were obtained.

As is shown in FIG. 11, an extremely good relationship is obtained between the polarization mode dispersion and fluctuation of the light intensity. As a result, it was clarified that, using the measuring method of the present invention, it is possible to evaluate the polarization mode dispersion of an optical fiber.

Next, using the apparatus shown in FIG. 5, a time series measurement of the light intensity was made. Eighteen optical fibers 2 were prepared for use, each one a single mode optical fiber of 1.2 km long whose polarization mode dispersion had been obtained using Jones Matrix Eigenanalysis method. These eighteen fibers were concatenated in sequence.

Figure 12A:
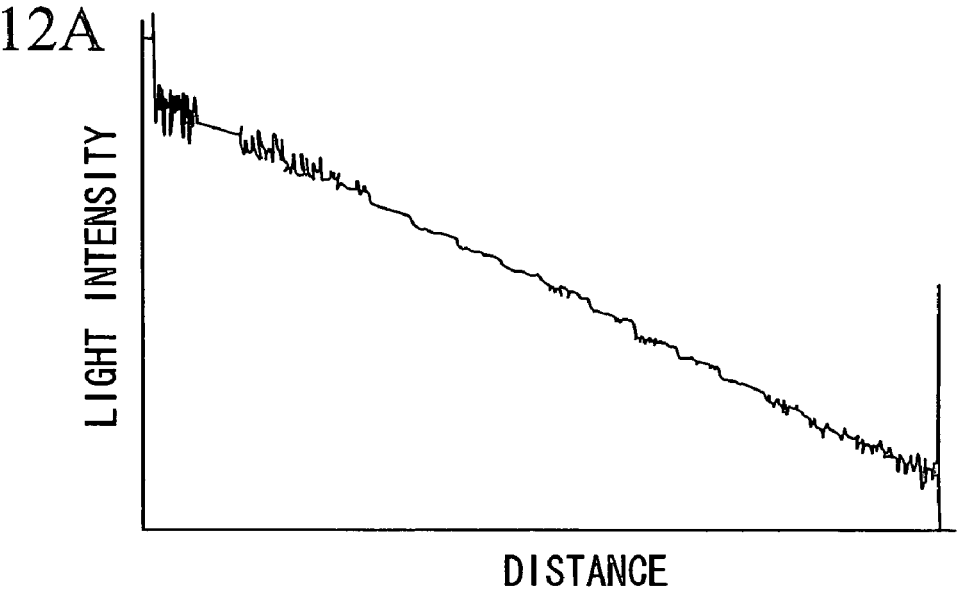
FIGS. 12A and 12B are graphs illustrating examples of relationships between distance in the longitudinal direction of optical fibers and regression residual errors of the light intensity of backscattered light.
Figure 12B:
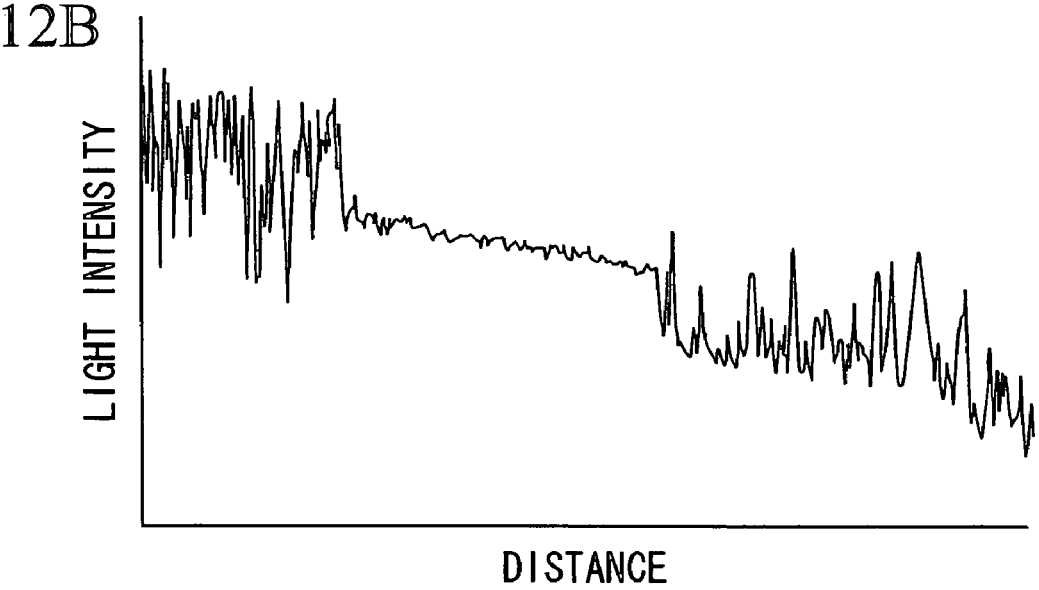

Time series data of the light intensity for the above optical fibers 2 is shown in FIG. 12A and FIG. 12B.

FIG. 12A shows the results obtained for all the optical fibers 2, while FIG. 12B shows the enlarged view of FIG. 12A for the four optical fibers nearest to the measuring apparatus.

It was found that, when there is a change in the polarization mode dispersion in the longitudinal direction of an optical fiber 2, there is also a change in the fluctuation of the light intensity corresponding to the polarization mode dispersion change.

Each section of the optical fibers 2 was measured. An example of a relationship between the fluctuation of the light intensity and the polarization mode dispersion measured using Jones Matrix Eigenanalysis method is shown in FIG. 13.

Figure 9:
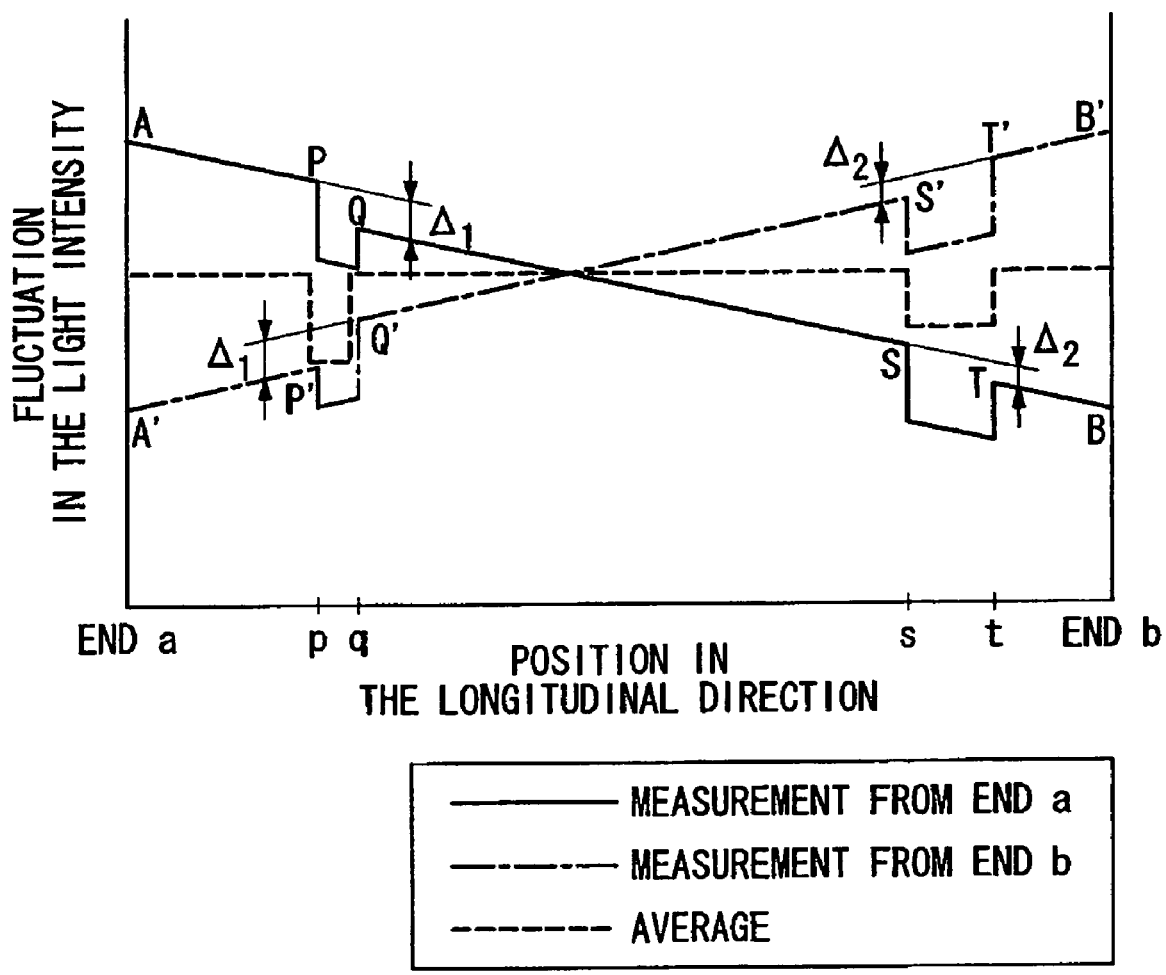
FIG. 9 is a graph comparing unevenness in light intensity measured from opposite ends of a long optical fiber.
Figure 13:
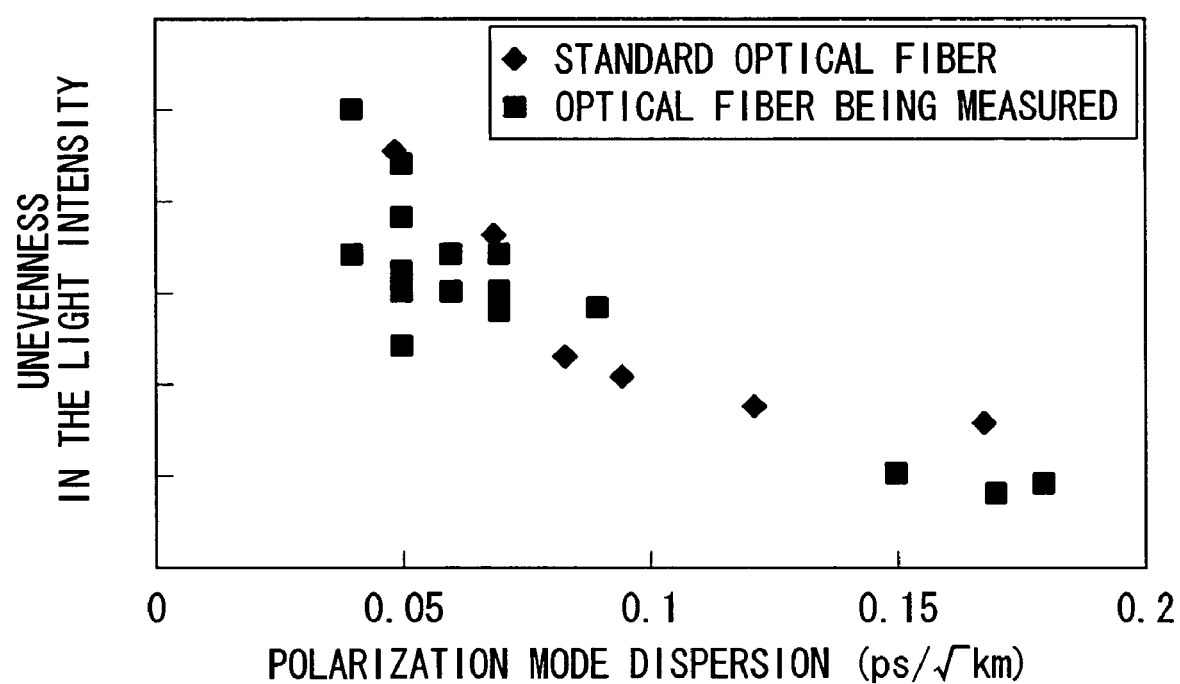
FIG. 13 is a graph illustrating an example of a relationship between fluctuation of the light intensity of the optical fiber and polarization mode dispersion.

In FIG. 13, the symbol "■" shows the results for the above described optical fibers 2, while the symbol "♦" shows the results for the conventional optical fiber shown in FIG. 9. As is clear from the results shown in FIG. 13, even when 18 optical fibers are concatenated in the longitudinal direction so that the total length was 21.6 km, the correlation between polarization mode dispersion and fluctuation of the light intensity shows the same trend as that for the results of FIG. 9. Namely, sections in which the polarization mode dispersion exceeds 0.10 ps/$\sqrt{km}$ can be clearly picked out from those in which the polarization mode dispersion is less than 0.10 ps/$\sqrt{km}$.

Namely, for an optical fiber that has a comparatively small birefringence and in which the polarization mode dispersion is approximately 0.01 to 0.2 ps/$\sqrt{km}$, the longitudinal distribution of the polarization mode dispersion of the optical fiber can be measured to a sufficiently practical degree, and it is possible in one measurement to differentiate between defective sections, in which the polarization mode dispersion is comparatively large, and superior sections, in which the polarization mode dispersion is comparatively small.

Note that the fact that a disparity of accuracy between the results for the above described concatenated optical fibers 2 (symbol "■") and the results for the conventional optical fiber shown in FIG. 9 (the symbol "♦") is evident in the correlation between polarization mode dispersion and fluctuation of the light intensity is because the measurement of the optical fiber 2 using the Jones Matrix Eigenanalysis method was performed only once for each section for the concatenated optical fiber and was affected by uncertainty of measurement in the Jones Matrix Eigenanalysis method (the standard deviation of Jones Matrix Eigenanalysis method is approximately 0.01 ps/$\sqrt{km}$).

Furthermore, as is shown in FIG. 7, when the pulse light and backscattered light that is input into or output from the optical fiber 2 is amplified using the optical amplifier apparatus 30 and then measured, the measurable distance was approximately 30 km. Compared with when the optical amplifier apparatus 30 was not used, the distance was extended by a factor of 1.5. Moreover, the polarization mode dispersion values measured using the present invention had substantially good agreement to the polarization mode dispersion values that were measured using the Jones Matrix Eigenanalysis method.

Next, examples relating to the second embodiment of the method of measuring polarization mode dispersion of the present invention will be described.

The optical fiber being measured had a length of approximately 35 km and the polarization mode dispersion thereof was found using the Jones Matrix Eigenanalysis method. The measuring apparatus shown in FIG. 6 was used as the measuring apparatus. With the optical fiber was sectionalized into 100 meter sections, fluctuation of the light intensity at respective positions in the longitudinal direction of the optical fiber was determined in the form of a standard deviation of the regression residual error of the light intensity within the range of each section.

Figure 14:
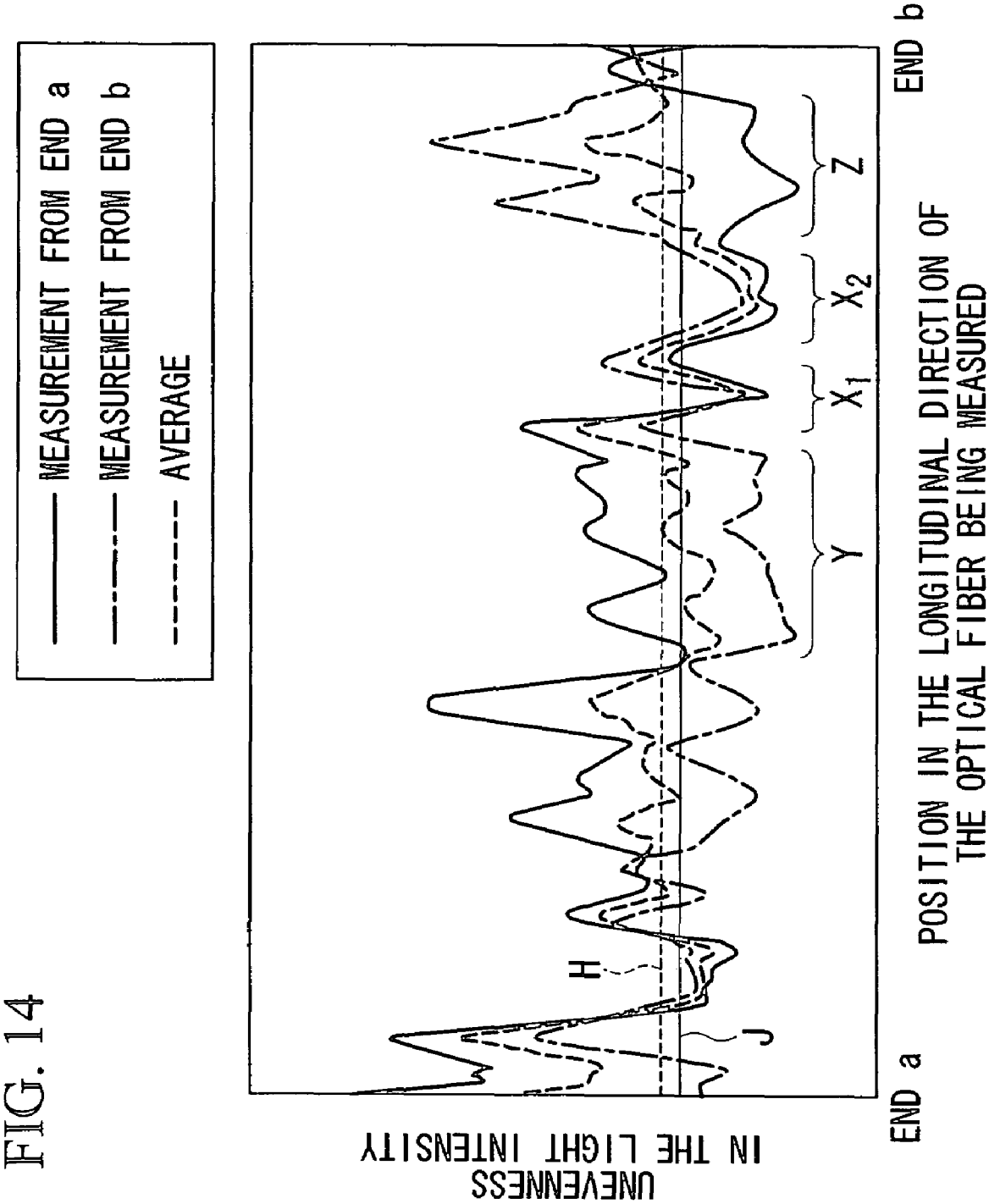
FIG. 14 is a graph illustrating another example of fluctuation of the light intensity of the optical fiber.

In FIG. 14, fluctuation of the light intensity from one end (this is referred to as the end "a") of the optical fiber 2 is shown as a thick solid line, while fluctuation of the light intensity from the other end (this is referred to as the end "b") of the optical fiber 2 is shown as a thick long and short dash line. Values obtained by averaging the measured values from the end a and the measured values from the end b are shown by a thick broken line.

In FIG. 14, the straight line J shows the level of fluctuation of the light intensity that is predicted from the average value of the PMD that is measured using the Jones Matrix Eigenanalysis method for the total length of the optical fiber 2. The straight line H shows the average level of the fluctuation of the light intensity that is obtained from the measurement using the process of the present invention.

As can be seen from these results, the fluctuation of the light intensity distributes up and down while showing a comparatively similar pattern, in locations that are beyond the sections where the PMD is bad (for example, X1 and X2 in FIG. 14) looking from the side of the measuring apparatus 1. For example, in the vicinity of Y when measurement is made from the end b and in the vicinity of Z when the measurement is made from the end a, the fluctuation of the light intensity is comparatively small, and the sections (the vicinity of Y for measurement from end b and the vicinity of Z for measurement from end a) appears as if they has poor PMDs. Moreover, in the vicinities of these sections Y and Z, in the average values shown by the thick, broken line in FIG. 14, because the fluctuation of the light intensity is fairly close to the predicted value that is based on a measurement made using Jones Matrix Eigenanalysis method, it was found that by averaging measurement values from both of the two ends of the optical fiber, the effects of sections where the PMD is poor can be avoided.

INDUSTRIAL APPLICABILITY

According to the present invention, because there is provided a method of measuring polarization mode dispersion in an optical fiber that uses a measuring apparatus that includes: a pulse generating device; an optical circulator that inputs pulse light, generated by the pulse light generating device, into one end of an optical fiber, and that also outputs backscattered light that has returned to the one end of the optical fiber; a photodetector that detects a light intensity of backscattered light discharged from the optical circulator as time series since the generation of the pulse light; an analyzer that analyzes polarization mode dispersion in an optical fiber based on an output from the photo detector; and at least one polarization splitting device that changes incident light input into an optical fiber and output light output from the optical fiber into linear polarized light, the present invention has the advantage that a tunable light source, a polarization controller, a polarization analyzer, and a phase detector are not required. Further, using a simple apparatus, it is possible to measure the longitudinal distribution of the polarization mode dispersion in an optical fiber with a practical accuracy.

The invention claimed is:

1. A method of measuring polarization mode dispersion of an optical fiber, comprising:
inputting a pulse of first linearly polarized light into the optical fiber;
separating second linearly polarized light from backscattered light generated by the input pulse light;
detecting a light intensity of the second linearly polarized light as time series data since the generation of the pulse light;
calculating a fluctuation of the detected light intensity; and
evaluating polarization mode dispersion of the optical fiber based on the calculated fluctuation value.

2. A method of measuring polarization mode dispersion of an optical fiber, comprising:
  inputting a pulse of first linearly polarized light into the optical fiber;
  separating second linearly polarized light from backscattered light generated by the input pulse light, the plane of polarization of the first linearly polarized light being the same as the plane of polarization of the second linearly polarized light;
  detecting a light intensity of the second linearly polarized light as time series data since the generation of the pulse light;
  calculating a fluctuation of the detected light intensity; and
  evaluating polarization mode dispersion of the optical fiber based on the calculated fluctuation value.

3. The method of measuring polarization mode dispersion in an optical fiber, according to claim 1 or 2, wherein:
  a first fluctuation of light intensity is calculated by inputting a pulse of the first linearly polarized light through a first end of the optical fiber and detecting time series data of the light intensity of the second linearly polarized light through the first end of the optical fiber;
  a second fluctuation of light intensity is calculated by inputting a pulse of the first linearly polarized light through a second end of the optical fiber and detecting time series data of the light intensity of the second linearly polarized light through the second end of the optical fiber; and
  polarization mode dispersion in the optical fiber is evaluated based on an average value of the first fluctuation and the second fluctuation.

4. The method of measuring polarization mode dispersion in an optical fiber according to claim 1 or 2, further comprising:
  evaluating polarization mode dispersion in a predetermined section of the optical fiber by comparing fluctuation of the light intensity measured in the predetermined section of the optical fiber with fluctuation of the light intensity measured using the same method in an optical fiber whose polarization mode dispersion is already known.

5. The method of measuring polarization mode dispersion in an optical fiber according to claim 1 or 2, further comprising:
  evaluating a longitudinal distribution of polarization mode dispersion of the optical fiber by comparing a fluctuation in the light intensity measured in each of a plurality of sections in the longitudinal direction of the optical fiber with fluctuation of the light intensity measured using the same method in an optical fiber whose polarization mode dispersion is already known.

6. The method of measuring polarization mode dispersion in an optical fiber according to claim 1 or 2, wherein the fluctuation of the light intensity is calculated as a regression residual error using the least-square method.

7. The method of measuring polarization mode dispersion in an optical fiber according to claim 1 or 2, wherein a scale of the fluctuation of the light intensity is standard deviation.

8. The method of measuring polarization mode dispersion in an optical fiber according to claim 1 or 2, wherein a scale of the fluctuation of the light intensity is a difference between a maximum value and a minimum value of the light intensity in each of a plurality of sections in the longitudinal direction of the optical fiber.

9. An apparatus for measuring polarization mode dispersion in an optical fiber, comprising:
  a pulse light generating device;
  an optical circulator that inputs pulse light generated by the pulse light generating device through an end of the optical fiber, and that outputs backscattered light that has returned through the end of the optical fiber;
  at least one polarizer that linearly polarizes the pulse light to be input into the optical fiber and backscattered light output from the optical fiber;
  a photodetector that detects a light intensity of linearly polarized light separated from the backscattered light output from the optical circulator as time series since the generation of the pulse light; and
  an analyzer that calculates a fluctuation of the light intensity of the linearly polarized light detected by the photodetector, and analyzes polarization mode dispersion in the optical fiber based on the calculated fluctuation value.

10. The apparatus for measuring polarization mode dispersion in an optical fiber according to claim 9, wherein the at least one polarizer polarizes the pulse light to be input into the optical fiber and the backscattered light output from the optical fiber into linearly polarized light of the same plane of polarization.

11. The apparatus for measuring polarization mode dispersion in an optical fiber according to claim 9, wherein the at least one polarizer is a polarization-beam-combiner-type coupler.

12. An apparatus for measuring polarization mode dispersion in an optical fiber, comprising:
  a commercialized OTDR apparatus that includes:
    a pulse light generating device; and
    a photodetector that detects a light intensity of linearly polarized light separate from backscattered light generated by the pulse light input through an end of the optical fiber as time series since the generation of the pulse light;
  an analyzer that calculates a fluctuation of the light intensity of the linearly polarized light detected by the photodetector, and analyzes polarization mode dispersion in the optical fiber based on the calculated fluctuation value; and
  a polarizer that polarizes the pulse light to be input into the optical fiber and the backscattered light output from the optical fiber into linear polarized light of the same plane of polarization.

13. The apparatus for measuring polarization mode dispersion in an optical fiber according to claim 12, wherein an optical amplifier is provided between the commercialized OTDR apparatus and the polarizer.

* * * * *